July 3, 1956
I. S. BARR
2,753,215
HOSE
Filed June 17, 1955
2 Sheets-Sheet 1
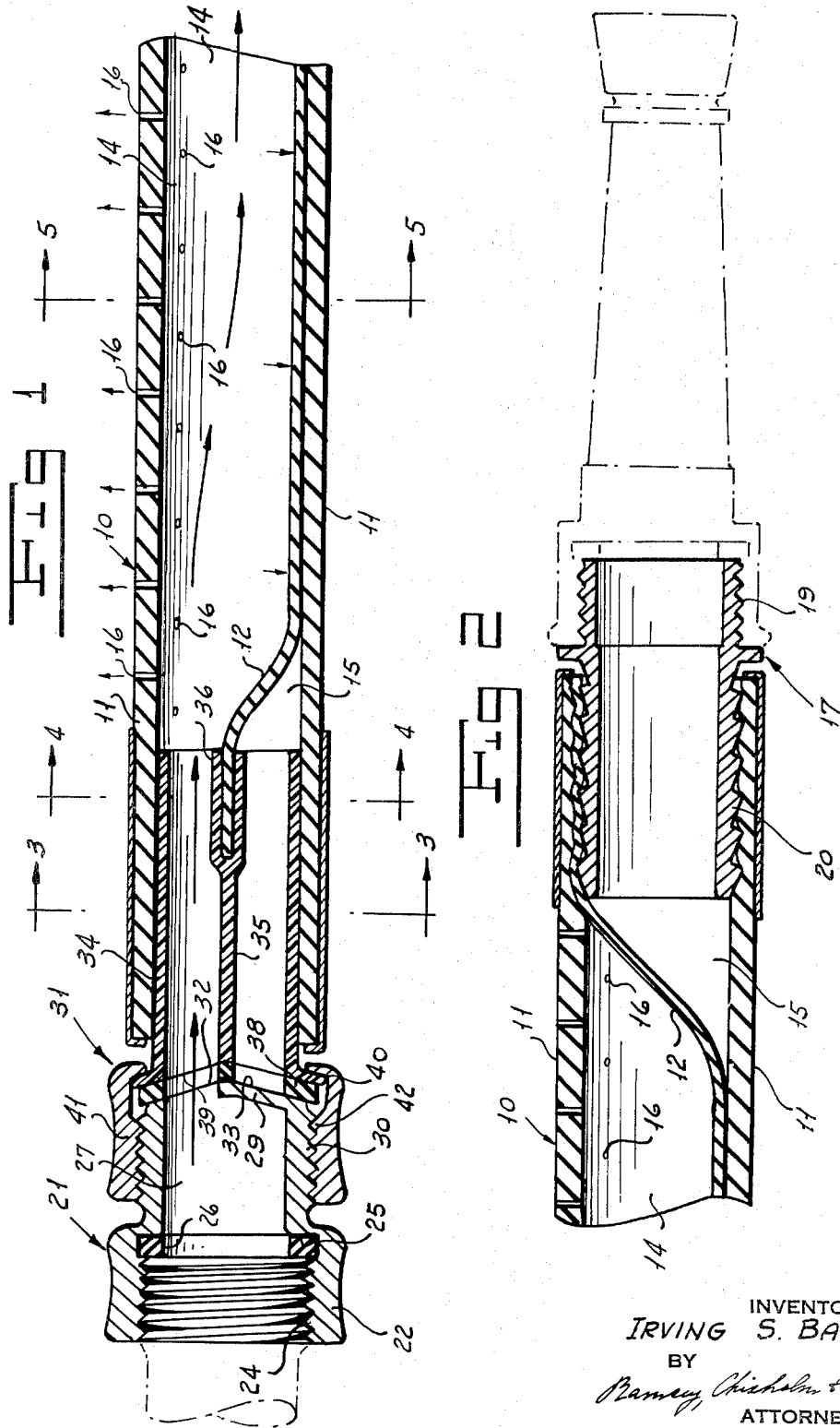
INVENTOR
IRVING S. BARR
BY
*Ramsey, Chisholm & Hilder*
ATTORNEYS July 3, 1956     I. S. BARR     2,753,215
HOSE
Filed June 17, 1955     2 Sheets-Sheet 2
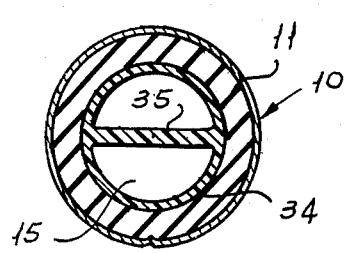
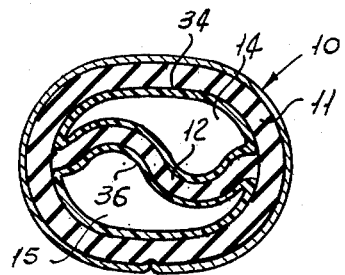
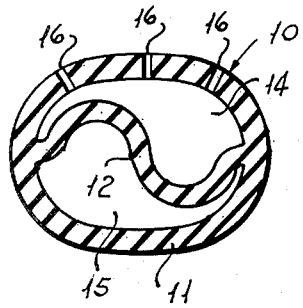
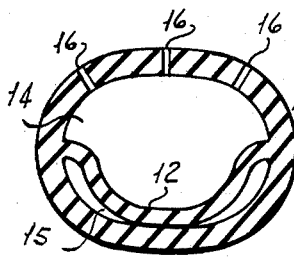
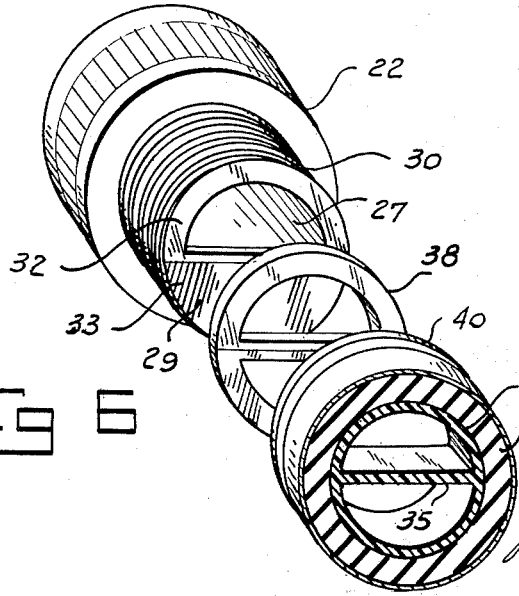
INVENTOR
*IRVING S. BARR*
BY
*Ramsay, Chisholm & Holden*
ATTORNEYS

United States Patent Office 2,753,215
Patented July 3, 1956

2,753,215

HOSE

Irving S. Barr, Blue Point, N. Y.

Application June 17, 1955, Serial No. 516,247

9 Claims. (Cl. 299—104)

This invention relates to hose construction, and more particularly to a hose of the garden type which may be used interchangeably as sprinkler or soaker hose or for general garden hose purposes.

In recent years, conventional garden hose formed of a layer of fabric surrounded by rubber has been largely superseded by extruded plastic hose formed usually of a flexible vinyl-plastic compound. The plastic hose is generally lighter in weight and more flexible and is more resistant to deterioration due to age. Such hose is provided with threaded couplings for connecting the hose to a water faucet and for receiving a nozzle, water sprinkler or other device.

In recent years, plastic hose for lawn sprinkling has been developed. This hose has a fitting on one end for connection to a water faucet, the other end of the hose being closed. One side of the hose is provided with a multiplicity of smaller diameter holes for spraying water, the holes being formed in the side wall of the hose.

The present invention is directed to a hose combining the functions and attributes of both the conventional plastic hose and the sprinkler-type hose, so that the same hose may be used interchangeably as a conventional hose for delivering water to a nozzle or other fitting or as a sprinkler hose for sprinkling an area, such as a lawn or garden. According to the present invention, an extruded plastic hose is formed with a flexible, longitudinally extending wall dividing the hose into two longitudinally extending passages. One of the passages concents with a threaded fitting on the end of the hose for receiving a nozzle or other device, and the other passage is provided with a multiplicity of small spray openings, the end of said passage being closed. A suitable fitting is provided for directing the water selectively through either of the passages of the hose and preventing the water from entering the other hose passage. The flexible dividing wall between the two passages is preferably constructed so as to be displaced against the outer wall of the hose by the pressure of water within the hose so as to enlarge the passage in use to a size approximating the cross-sectional area of both passages, substantially eliminating the other passage.

Among the objects of the present invention are to provide a hose of the type described which may be used interchangeably for either delivering water or for spraying an area, to provide such a hose having a flexible inner wall displaceable by water pressure to enlarge either passage of the hose and correspondingly reduce the other passage, and to provide an improved hose coupling for use with hose of the type described.

Other objects and the nature and scope of the invention will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 1 is a somewhat diagrammatic longitudinal section of an end of the hose and the coupling for connecting to a faucet.

Fig. 2 is a somewhat diagrammatic longitudinal section of the delivery end of the hose, including a coupling and a nozzle being indicated in broken lines.

Fig. 3 is a transverse section of the hose, taken on the line 3—3 of Fig. 1.

Fig. 4 is a view similar to Fig. 3, taken on the line 4—4 of Fig. 1.

Fig. 5 is a transverse section of the hose taken on the line 5—5 of Fig. 1, intermediate the ends of the hose.

Fig. 6 is a somewhat diagrammatic exploded isometric view of coupling parts at the supply or faucet end of the hose.

Fig. 7 is a section similar to Fig. 5, showing the position of the dividing wall when there is no pressure within the hose.

Referring now to the drawings, the hose 10 of the present invention comprises a flexible hose which may be extruded or otherwise formed of flexible vinyl or other suitable plastic. The hose 10 has an outer circumferential wall 11 which may be of oval cross section. A flexible, imperforate inner dividing wall 12, which is preferably formed integral with the circumferential wall 11 of the hose, divides the hose into a pair of longitudinal passages 14 and 15.

The width of the dividing wall 12 is preferably approximately equal to the inner circumference of the wall 11 between points of attachment of the wall 12 to permit the wall 12 to be pressed more or less tightly against the circumferential wall by pressure within the hose so as to enlarge either of the passages 14 and 15 to fill substantially the entire interior of the hose, the other passage being correspondingly reduced.

A series of holes 16 of very small diameter are formed along the length of the circumferential wall 11 and opening into the longitudinal passage 14, the holes 16 being more or less regularly spaced along the hose to provide a multiplicity of apertures from which water will spray from the passage 14. Preferably, the holes 16 extend along a zone of about 135° of the circumference of the hose and for the full length thereof.

A hose coupling 17 is provided at the nozzle or delivery end of the hose. The coupling 17 (see Fig. 2) may be more or less a conventional male-type coupling having external threads 19 and having a shank 20 received within the end of the hose 10. The flexible, dividing inner wall 12 of the hose overlaps the shank 20 of the coupling, the shank being received within the longitudinal passage 15 and serving to hold the dividing wall against the inner circumference of the hose wall 11 so as to close off one end of the longitudinal passage 14 having the water-spray holes formed therein.

A two-part coupling 21 is provided at the faucet or supply end of the hose. A first part 22 of the coupling 21 is provided with internal threads 24 for engagement with the threads of a faucet and a more or less conventional step or seat 25 for receiving a hose washer 26.

The delivery end of the first-coupling part 22 is provided with an annular passage 27, one-half of which is closed by a baffle 29, one edge of the baffle lying generally along a diameter of the passage 27. The delivery end of the first-coupling part 22 may be provided with external threads 30 for engagement with a second-coupling part 22 which is preferably formed as shown in the drawings with the surfaces 32 and 33 being generally planar and making an obtuse angle for interfitting with the end of the hose, as will be described.

The hose 10 preferably is provided with a more or less rigid terminal section 34, which fits within the end of the hose 10. The terminal section 34 is preferably annular in cross section and has a longitudinally extending wall 35, which extends diametrically of the section at the end of the hose (see Fig. 3) and by degrees assumes the S curve of the wall 12 of the hose, as indicated in Fig. 4, the end 36 thereof being slotted to receive the end of the wall 12 of the hose. The terminal section 34 is preferably moulded of a more or less rigid vinyl plastic and, after insertion into the end of the hose, is fused or otherwise welded to the hose and may be reinforced by a brass ferrule about the outside of the hose.

The outer end of the terminal section 34 is provided with an annular flange 40 which is received within the second-coupling part 31. The second-coupling part 31 has an annular body 41 provided with internal threads 42 for engaging the threads 30 in the first-coupling part.

The end 39 of the terminal section 34 is shaped to conform to the surfaces 32 and 33 of the first-coupling part, the baffle 29 being located as to completely close one or the other of the passages in the second coupling part and the hose formed by the interior walls 35 and 12 respectively. The interengagement of the two coupling parts is such that they can be engaged in the position shown in the drawings and also when the hose 10 and terminal section 34 are rotated 180° so as to cause the baffle 29 to obstruct the other of the two passages in the terminal section and hose. A moulded soft rubber washer 38 shaped to conform to the surfaces 32 and 33 of the second coupling part and the interengaging surfaces of the terminal section 34 of the hose may be utilized to prevent leakage into the passage of the hose not being used.

In operation of the hose of the present invention, the first coupling part 22 may be left attached to the faucet (not shown) at all times. The hose can be used interchangeably either as a hose or as a sprinkler merely by releasing the first and second coupling parts 22 and 31 respectively, rotating the hose 10 180° and reengaging the coupling parts. At either position of the hose 10, one of the passages in the terminal section 34 is blocked, cutting off the flow of water through the corresponding passage in the hose 10. Water flowing through the passage in the second coupling part 31 will flow into the corresponding passage 14 or 15 in the hose. At the water pressure builds up within the hose, the wall 12 for the entire length of the hose will be displaced against the outside wall of the hose. When the first coupling part 22 and hose are oriented so as to open the path of water into the longitudinal passage 14 within the hose, the water will issue as a spray from the holes 16 in the outer wall of the hose, the nozzle end of this passage being permanently blocked by the shank 20 of the house coupling 17. When the water path into the hose passage 15 is opened for the flow of water, the water will flow in the normal manner from the hose coupling 17. In either event, due to the flexible inner dividing wall 12, substantially the entire interior of the hose will be available for the flow of water.

I claim:

1. An extruded, flexible, plastic hose having a flexible, longitudinal dividing wall extending substantially the entire length of the hose and forming a pair of passages within the hose, a coupling on the delivery end of the hose, said coupling communicating with one of the passages and displacing the dividing wall against the outer wall of the hose to close the other passage, and a coupling on the supply end of the hose having means for directing the flow of fluid selectively through either of the passages, the hose having a multiplicity of small holes in the outer wall thereof opening into the passage closed by the coupling on the delivery end of the hose.

2. An extruded, flexible, plastic hose having a flexible, longitudinal dividing wall extending substantially the entire length of the hose and forming a pair of passages within the hose, a coupling on the delivery end of the hose, said coupling communicating with one of the passages and the other passage being closed adjacent said coupling, and a coupling on the supply end of the hose having means for directing the flow of fluid selectively through either of the passages, the hose having a multiplicity of small holes in the outer wall thereof opening into the passage closed by the coupling on the delivery end of the hose.

3. An extruded, flexible, plastic hose having a flexible, longitudinal dividing wall extending substantially the entire length of the hose and forming a pair of passages within the hose, a coupling on the delivery end of the hose, said coupling communicating with one of the passages and displacing the dividing wall against the outer wall of the hose to close the other passage, and a coupling on the supply end of the hose for selectively directing the flow of fluid through either one of the two passages, the dividing wall at the supply end of the hose extending generally diametrically of the hose, and the coupling on said end of the hose having a baffle extending generally diametrically and being positionable so as to block one or the other of the two passages, the hose having a multiplicity of small holes in the outer wall thereof opening into the passage closed by the coupling on the delivery end of the hose.

4. An extruded, flexible, plastic hose having a flexible, longitudinal dividing wall extending substantially the entire length of the hose and forming a pair of passages within the hose, a coupling on the delivery end of the hose, said coupling communicating with one of the passages and the other passage being closed adjacent said coupling, and a coupling on the supply end of the hose for selectively directing the flow of fluid through either one of the two passages, the dividing wall at the supply end of the hose extending generally diametrically of the hose, and the coupling on said end of the hose having a baffle extending generally diametrically and being positionable so as block one or the other of the two passages, the hose having a multiplicity of small holes in the outer wall thereof opening into the passage closed adjacent the coupling on the delivery end of the hose.

5. An extruded, flexible, plastic hose having a flexible, longitudinal dividing wall extending substantially the entire length of the hose and forming a pair of passages within the hose, a coupling on the delivery end of the hose, said coupling communicating with one of the passages and displacing the dividing wall against the outer wall of the hose to close the other passages, and a coupling on the supply end of the hose for selectively directing the flow of fluid through either one of the two passages, the dividing wall at the supply end of the hose extending generally diametrically of the hose, and the coupling on said end of the hose having a baffle extending generally diametrically and being positionable so as to block one or the other of the two passages, the hose having a multiplicity of small holes in the outer wall thereof opening into the passage closed by the coupling on the delivery end of the hose, and the coupling on the supply end of the hose being so constructed and arranged that the baffle is positionable in only two diametrically opposite positions, in one of which the supply end of one passage is closed and in the other of which said end of the other passage is closed.

6. A hose of extruded, flexible plastic material, said hose being of generally oval cross section and having a longitudinal inner dividing wall extending between the opposite sides of the hose along the major diameter and forming a pair of passages extending the length of the hose, the outer wall of the hose adjacent one passageway having a multiplicity of small holes formed therein, the dividing wall having a width approximating the distance along the inner circumference of the hose between the edges of the dividing wall.

7. An extruded, flexible, plastic hose of generally annular cross section having a longitudinal dividing wall extending substantially the entire length of the hose and forming a pair of passages within the hose, and a coupling on the delivery end of the hose, the coupling communicating with one of the passages and displacing the dividing wall against the outer wall of the hose to close the other passage.

8. An extruded, flexible, plastic hose of generally annular cross section having a longitudinal dividing wall extending substantially the entire length of the hose and forming a pair of passages within the hose, and a coupling on the delivery end of the hose, the coupling communicating with one of the passages and displacing the dividing wall against the outer wall of the hose to close the other passage, and the outer wall of the hose having a multiplicity of small holes formed therein communicating with the passage closed by said coupling.

9. An extruded, flexible, plastic hose of generally annular cross section having a longitudinal dividing wall extending substantially the entire length of the hose and forming a pair of passages within the hose, and a coupling on the delivery end of the hose and communicating with one of the passages, the other passage having a closed end adjacent said coupling, and the outer wall of the hose having a multiplicity of small holes formed therein communicating with the passage closed adjacent the coupling.

References Cited in the file of this patent

UNITED STATES PATENTS

| | | |
|---|---|---|
| 2,086,654 | Winder | July 13, 1937 |
| 2,624,341 | Wallace | Jan. 6, 1953 |
| 2,705,662 | Leonard | Apr. 5, 1955 |